J. W. WESTON.
Car Wheel.
No. 101,686.  Patented April 5, 1870.
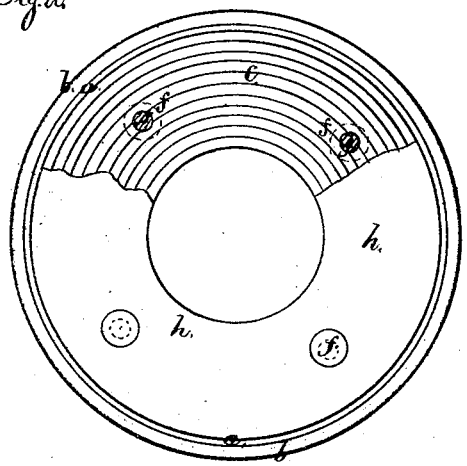
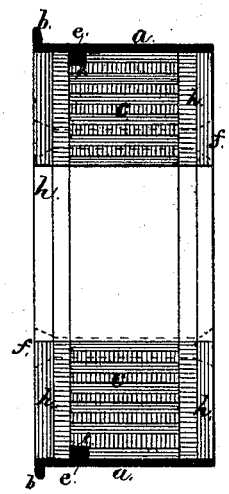
Witnesses:
Geo. D. Walker
Geo. T. Pinckney
Inventor:
J. W. Weston

United States Patent Office.

JAMES W. WESTON, OF NEW YORK, N. Y.

Letters Patent No. 101,686, dated April 5, 1870.

IMPROVED CAR-WHEEL.

The Schedule referred to in these Letters Patent and making part of the same.

*To all whom it may concern:*

Be it known that I, JAMES W. WESTON, of the city and State of New York, have invented and made a new and useful Improvement in Wheels for Carriages, Cars, and other Vehicles; and I do hereby declare the following to be a full, clear, and exact description of the said invention, reference being had to the annexed drawing making part of this specification, wherein—

Figure 1 is a vertical section of a car-wheel made with my improvement.

Figure 2 is an elevation, partially in section, of said wheel.

Similar marks of reference denote the same parts.

Wheels have heretofore been made of metal and wood united, and wheels for cars made entirely of metal are well known.

In many places it is important to prevent noise, particularly with elevated railroads in cities, and under all circumstances the noise and jar produced by the rigid wheels are detrimental, the track and the vehicles are injured by the concussion, the parties riding within or upon upon such vehicle are inconvenienced by the motion, and the risk of the wheels, axles, rails, or other parts breaking is increased where the wheels are rigid.

My invention is designed for imparting a small amount of elasticity to the wheel itself, and thereby relieve the concussion of the wheel in passing inequalities in the surface traveled over, thereby removing or lessening the aforesaid difficulties.

My invention consists in introducing into the body of a wheel layers of wood rolled up into a cylindrical form, and united by glue or other cement, so that said layers of wood shall form a slight spring between the felloe or rim and the axle, and relieve the latter from undue strain when the former comes into contact with inequalities in the surface traveled over.

In the drawing—

$a$ represents the tire or felloe of the wheel, the tire being made of iron or steel and formed with a flange, $b$, when the wheel is to be used on railroads.

$c$ is the portion of the wheel that is formed of laminæ of wood wound up into the form of a ring, and introduced between the metal hub or axle and the tire or felloe, so as to produce a spring or slight yielding in the wood itself.

The wood applied in this manner is not likely to split or become injured, and the yielding movement is uniform all around the wheel, which is not the case with the wheels that have before been made of wood and iron, in which spokes or segments of wood are employed.

The connection between the wooden body $c$ and the metal tire is made by means of the rib $e$, that is formed on the inside of the tire and passes into a groove formed in the body $c$, or any other desired attachment may be employed.

The entire body of the wheel may be made of laminæ of wood, rolled up as aforesaid, and the surfaces or faces of the wheel be protected by means of paint or other material, or, if desired, disks of veneer or laminæ of wood, $h$, may be used as a covering or facing to the wheel, and in that case the layers should be attached together with the grains crossing each other, and rivets, $f$, may be employed to attach the disks $h$ to the faces of the wheel.

I do not claim a rim or felloe of a wheel made of laminæ of wood rolled up and connected by spokes to a hub, as this is not adapted to car-wheels.

What I claim, and desire to secure by Letters Patent, is—

A wheel, in which the body of the wheel between the hub and the metallic rim or tire is formed of laminæ of wood, in the manner specified.

In witness whereof I have hereunto set my signature this 3d day of May, A. D. 1869.

J. W. WESTON.

Witnesses:
GEO. D. WALKER,
GEO. T. PINCKNEY.